United States Patent Office 3,425,784
Patented Feb. 4, 1969

3,425,784
DYEING POROUS STONE WITH LEUCO ESTER OF VAT DYE
Clemens Streck, Loudonville, N.Y., assignor to GAF Corporation, New York, N.Y., a corporation of Delaware
No Drawing. Filed Dec. 30, 1965, Ser. No. 517,856
U.S. Cl. 8—8
Int. Cl. B44d 1/20
9 Claims The present invention relates to a method of dyeing porous stones and more particularly, to a method of dyeing porous stones which utilizes water-soluble leuco esters of vat dyes.

There has been a great demand in the building industry for a stone which is vividly colored and at the same time possessing sufficiently high strength so that it may be used as a building material. However, since such stone occurs naturally in only a very limited number of localities, it is not readily available as a building material in most areas of the United States. Furthermore, transportation costs make the use of such naturally occurring colored stones prohibitive for a great many purposes. Additionally, in view of the fact that such natural stone occurs in only a limited number of vivid colors and hues, a great restriction is placed upon its commercial employment.

Any naturally occurring stone can be effectively dyed by the process of the present invention. The present process, however, is particularly suitable to the coloring of such materials as granite, dolomitic limestone, whitestone, dolomite, calcitic limestone, marble or aquatic animal shells, etc. Therefore, the term "porous stone" as used hereinafter shall represent any and all of such dyeable materials.

As a result of the various disadvantages of the use of naturally occurring colored stones, there has been a great deal of experimentation to produce artificially colored stones economically having desirable properties similar to those of naturally occurring colored stones.

Until now, this experimentation has been unsuccessful in producing an artificial stone with the properties of naturally occurring materials. The properties which have not been capable of being artificially reproduced are, for example, the vivid, intense color extending into the interior of a natural stone, high strength of naturally colored stone, high resistance to fading upon exposure to ultraviolet light, oxygen and oxidizing agents, moisture and other elements of weathering.

Prior art processes for the production of artificially colored stones have involved a pretreatment for the purpose of removing the moisture or water content of the stone prior to any coloring step. After the vigorous pretreatment to remove tightly held water content, the stone was colored by contacting it with a solution of a dye to produce the artificially colored product. However, in all cases the resultant product was quite unsatisfactory due to the low levels of color intensity that was capable of being produced by these processes, as well as due to a weakening of its crystalline structure and lowering of mechanical properties from the vigorous water removal. In addition, the prior art processes did not result in satisfactory penetration and retention of the coloring matter throughout the stone. Furthermore, the vigorous pretreatment necessary to remove moisture or water content from the stone to be artificially colored, was economically disadvantageous in that expensive special equipment and a large amount of heat was required to produce the desired result.

Therefore, in view of the great disadvantages of prior known processes for producing artificially colored stones, the art has long sought an entirely satisfactory method for the coloring of naturally occurring stone so as to resemble the less available, more expensive, natural product.

In accordance with the process of the present invention it has now been found that artificially colored stones of strength and brilliance equivalent to naturally occurring colored materials can be prepared by dyeing a naturally occurring porous stone with water-soluble leuco esters of vat dyes.

It is, therefore, a primary object of the present invention to provide a process for the coloring of naturally occurring porous stone, which process is not plagued with the inherent disadvantages and deficiencies of previously employed processes.

It is a further object of the present invention to provide a process for artificially coloring naturally occurring porous stones wherein products of strength and brilliance equivalent to naturally occurring colored materials are produced.

It is still a further object of the present invention to provide a process for artificially coloring naturally occurring porous stones wherein water-soluble leuco esters of vat dyes are utilized.

In accordance with the process of the present invention, it has been unexpectedly found that excellent dyeings of porous stones can be accomplished by the employment of water-soluble leuco esters of vat dyes.

In general, the process of the present invention comprises applying to the porous stone, as by brushing, spraying, wiping, dipping, or any other equivalent means, a solution of a water-soluble leuco ester of a vat dye.

Any well-known leuco ester of a vat dye can be used in accordance with the process of the present invention. In general, they are water-soluble sulfuric acid esters of leuco vat dyes of the anthroaquinone and indigoid series. A more detailed description of such leuco esters of vat dyes can be found in Lubs, the Chemistry Synthetic Dyes and Pigments, ACS Monograph No. 127, Reinhold Publishing Corporation, 1955, pages 534 to 546 and Vankataraman, Synthetic Dyes, Academic Press, 1952, pp. 1046–1059. A number of specific water-soluble leuco esters which may be employed in the process of the present invention are disclosed in Lubs. Op. Cit., pages 538 to 546 inclusive. As typical commercially available products which may be employed, may be mentioned:

Algosol Blue IBC, C. I. Solubilized Vat Blue 6, C. I. 69826
Algosol Blue O–CF, C. I. Solubilized Vat Blue 1, C. I. 73002
Algosol Brilliant Orange IRKL, C. I. Solubilized Vat Orange 3, C. I. 59301
Algosol Brilliant Violet 14R–CF, C. I. Solubilized Vat Violet 1, C. I. 60011
Brown 1RRD, C. I. Solubilized Vat Brown 5, C. I. 73411
Yellow IRK, C. I. Solubilized Vat Orange 1, C. I. 59106
Green 1B–CF, C. I. Solubilized Vat Green 1, C. I. 59826
Pink 1R, C. I. Solubilized Vat Red 1, C. I. 73361
Yellow GCA–CF, C. I. Solubilized Vat Yellow 2, C. I. 67301

The solution of the water-soluble leuco ester of the vat dye is usually employed as an aqueous solution having a concentration of the dye of from about 0.1% to about 25% by weight. In addition to the employment of aqueous solutions, the water-soluble leuco ester of the vat dye may be dissolve in various organic solvents or mixtures of such solvents, with water.

The organic solvents, if used, should be water-miscible and of relatively high volatility for quick evaporation. These are exemplified by methanol, ethanol, propanol, butanol, acetone, dimethyl formamide, Cellosolve (ethyl ether of ethylene glycol), butyl Cellosolve (butyl ether of ethylene glycol), dimethyl sulfoxide and the like. Other assistants may be present if desired.

The use of such organic solvent has been found to be beneficial in the penetration of the stone by the dyeing solution.

The dyeing solution of the present invention also contains oxidizing agents in an amount sufficient to regenerate the vat dye. Suitable oxidizing agents which may be used, for example include such compounds as peroxides, per-acids, ferric salts, cupric nitrous acid, chromic acid, chlorates, and the like. In general, any known oxidizing agent can be employed to regenerate the vat dye of the present invention. Such oxidizing agent is usually present in an amount of from 0.1 to about 15%.

After application of the dyeing solution to the stone, color gradually develops. However, it has been found that a fuller color develops more rapidly if the treated stone is exposed to a heat treatment which is insufficient to cause damage to the stone. The lower the temperature, however, the greater the time necessary for color development. Treatment usually ranges from about room temperature to a temperature of about 400° F. for a time from about ½ minute to about ½ hour. Alternatively, the vat dye can be regenerated by cottage steaming, vat ageing, or even acid ageing.

In an alternative method for artificially dyeing the porous stones by the use of water-soluble leuco esters of vat dyes, the dye solution without the oxidizing agent may be applied to the stone to be colored. After suitable time to allow penetration of the solution into the stone, the stone is then treated with a solution of the oxidizing agent in order to regenerate the vat dye. By either method, dyeings are achieved which are brilliantly colored, have a great degree of lightfastness, and which are extremely insensitive to solvents, acids, etc.

It is important to note that the dyeing process of the present invention does not necessitate a pretreatment step for the removal of water. This, therefore, is a great advantage over previously employed dyeing methods. Moreover, by the process of the present invention, dyeings of exceptional light fastness are produced along with an unusual and unexpected insensitivity to solvents and acids. Therefore, in addition to the use of these materials as building stones, etc., the products produced by the process of the present invention have been found to have outstanding utility as plates for mounting certain types of machinery found in commercal installations because of their unusual insensitivity to solvents, acids, etc. Of course, the products of the present invention can be used for building, gravestones, etc., or any other special use where strength and coloring are desired.

The following specific examples illustrate various embodiments of the present invention. Such examples are set as illustrative only, and are not to be deemed as limiting the invention set forth in the foregoing specification and appended claims:

EXAMPLE I

The following solution was prepared:

| | Grams |
|---|---|
| Algosol Green IBW Pst. (C.I. 59826) | 2 |
| Glyezine A (a polyglycol composition used in pasting dyes and pigments, GAF | 2 |
| Water | 10 |
| Alcohol | 10 |

This solution was wiped onto the surface of granite and allowed to stand about 30 minutes. A solution which consisted of 50 parts of hydrogen peroxide (30–35%) and 50 parts ammonium vanadate solution (1%) was then applied. Color developed on standing for 1 hour. The excess pigment was removed by washing, and the granite was buffed and finished. The granite was dyed a pleasing green shade which had excellent light fastness, and was impervious to color change on contact with acid and oil.

EXAMPLES II–V

| | Ex. II | Ex. III | Ex. IV | Ex. V |
|---|---|---|---|---|
| Algosol Blue IBC (C.I. 69826) | 2 g | | | |
| Algosol Green IBW Pst. (C.I. 59826) | | 2 g | | |
| Algosol Brown IBR (C.I. 70801) | | | 2 g | |
| Algosol Red IFBB (C.I. 67001) | | | | 2 g. |
| Glyezine A | 2 cc | 2 cc | 2 cc | 2 cc. |
| Sodium Chlorate Solution (33⅓% solution) | 2 cc | 2 cc | 2 cc | 2 cc. |
| Ammonium Vanadate Solution (1%) | 1 cc | 1 cc | 1 cc | 1 cc. |
| Ammonium Thiocyanate Solution (50%) | 3 cc | 3 cc | 3 cc | 3 cc. |
| Dimethyl Formamide | 3 cc | 3 cc | 3 cc | 3 cc. |

The solutions were wiped onto plates of granite and the excess solution was wiped off. After air drying for 30 minutes, the plates were exposed to dry heat for 3 minutes at 300° F. The plates were scoured with detergent solution to remove excess surface pigment, buffed, and finished. Bright full shades were obtained.

EXAMPLE VI–IX

Granite was colored in the manner of Example I, employing the following leuco esters:

Ex. VI—Algosol Gray IBL (C.I. 73671)
Ex. VII—Algosol Yellow IB (C.I. 67301)
Ex. VIII—Algosol Green IB (C.I. 59826)
Ex. IX—Algosol Orange HR (C.I. 73336)

In these cases, however, instead of allowing to stand for 1 hour, the granite plates were allowed to stand for about 30 minutes, and were then exposed to steam for 5 minutes. After washing, buffing and finishing, the plates were dyed in bright full colors which had excellent light fastness and were impervious to a color change on contact with acid and oil.

EXAMPLE X

Example I was repeated with the exception that the Algosol was substituted by 2 grams of Algosol Scarlet HB which is a mixture of the Algosols of C.I. Vat Red 1 and C. I. Vat Orange 5. The granite was dyed a pleasing scarlet shade which had excellent light fastness and was impervious to color change on contact with acid and oil.

While various embodiments have been set forth by way of illustrative examples, it is to be understood that the represent invention is not to be deemed to be limited thereto, but should be construed as broadly as all or any equivalents thereof.

What is claimed is:

1. A process for artificially coloring naturally occurring porous stone which comprises applying thereto a dyeing solution comprising from about 0.1% to about 25% by weight of a water-soluble leuco ester of a vat dye and an oxidizing agent in an amount sufficient to regenerate said dye in a solvent selected from the group consisting of water, volatile water soluble organic solvents, and mixtures thereof.

2. The process according to claim 1 wherein said porous stone is granite.

3. The process according to claim 1 wherein the solvent is water.

4. The process according to claim 1 wherein the porous stone is subjected to a temperature of from room temperature to about 400° F. for a period of from ½ minute to ½ hour after application of the dyeing solution.

5. The process according to claim 4 wherein the porous stone is granite.

6. The process according to claim 4 wherein the solvent is water.

7. A process for artificially coloring naturally occurring porous stone which comprises applying thereto a dyeing solution comprising from about 0.1% to about 25% by weight of a water-soluble leuco ester of a vat dye in a solvent selected from the group consisting of water, volatile water-soluble organic solvents and mixtures thereof, allowing the solution to penetrate the stone, and thereafter applying thereto an aqueous solution of an oxidizing agent in an amount sufficient to regenerate the vat dye.

8. The process according to claim 7 wherein the porous stone is granite.

9. The process according to claim 7 wherein the solvent is water.

References Cited

UNITED STATES PATENTS 1,856,366   5/1932   White.

NORMAN G. TORCHIN, *Primary Examiner.*

DONALD LEVY, *Assistant Examiner.*

U.S. Cl. X.R.

8—35